Dec. 19, 1961   J. A. PATTERSON   3,013,776
SEED TREATING APPARATUS
Filed Feb. 27, 1958
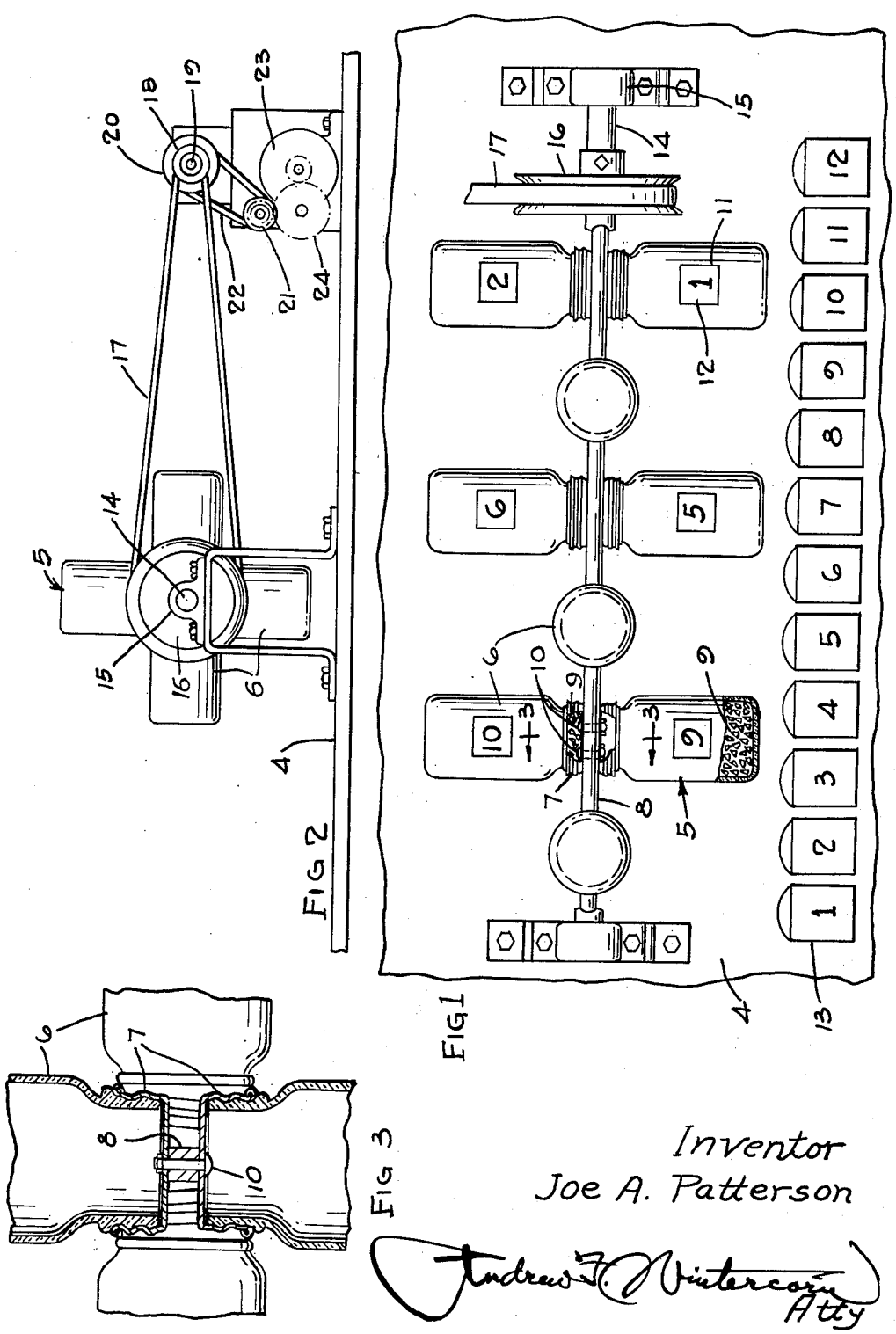
Inventor
Joe A. Patterson
Andrew F. Wintercorn
Atty

United States Patent Office 3,013,776
Patented Dec. 19, 1961

3,013,776
SEED TREATING APPARATUS
Joe A. Patterson, 206 Cherry Ave., Rochelle, Ill.
Filed Feb. 27, 1958, Ser. No. 718,034
2 Claims. (Cl. 259—57)

This invention relates to a new and improved seed treating apparatus especially designed and adapted for use in the chemical treatment of seed corn with dieldrin and aerosan to improve germination and repel pests, but, of course, also adapted for various other uses.

In the chemical treatment of seed corn, it is important that all of the kernels be treated uniformly all over for best results, and that is a problem because seed corn kernels absorb liquid slowly, and the chemical is too expensive to waste. It is, therefore, the principal object of my invention to provide an apparatus designed to tumble the seed with the chemical until all of the kernels have been treated uniformly all over, the tumbling being done in transparent liquid tight containers so that the operator is enabled to check the progress of the treatment from time to time and can be certain that all of the chemical has been absorbed before the seeds are removed, the containers being numbered to correspond with the numbering of envelopes used in keeping records of the different varieties of seeds being treated, so that a reliable record may be kept and the resulting yield compared with the amount of chemical used in the treatment, to determine accurately the efficiency obtained. Apparatus of this kind will therefore be found useful by research laboratories and large packing companies and others, wherever experimental farming is conducted and comparisons are made between yields and seed treatments.

The invention is illustrated in the accompanying drawings, in which—

FIG. 1 is a plan view of a seed treating apparatus made in accordance with my invention.

FIG. 2 is an end view of the apparatus on a smaller scale, and

FIG. 3 is a sectional detail on the line 3—3 of FIG. 1.

The same reference numerals are applied to corresponding parts throughout these views.

Referring to the drawing, the reference numeral 4 designates a table on which is mounted the seed treating apparatus indicated generally by the reference numeral 5, consisting of a plurality of transparent glass jars 6 mounted by means of their screw caps 7 in pairs on opposite sides of a square shaft 8 for rotation slowly so that seed corn kernels, like those indicated at 9, placed in the jars with a given amount of the liquid chemical, such as dieldrin and aerosan may be tumbled until all of the chemical has been absorbed, the chemicals mentioned serving to promote germination and repel pests. Two bolts 10 are provided in connection with each pair of jars to fasten the caps firmly onto the opposite sides of the shaft 8 and hold the same against turning so that the jars may be screwed on as tightly as necessary to eliminate likelihood of leakage, and may be unscrewed later when the seed is to be removed.

The jars 6 all have labels 11 applied thereto and these labels are numbered 1 to 12 as indicated at 12 to correspond with the numbering of the twelve envelopes or containers indicated at 13 which are placed on the table 4 as each series of batches of seeds are treated. Anywhere from 50 to 200 kernels of seed corn may be deposited in a given jar with an accurately measured amount of the chemical. In that way, the operator can run as many as twelve different experiments at one time to determine how little or how much chemical is needed for the best results from a yield standpoint. The time required for complete absorption can also be recorded so that there is no wasting of power in needlessly continuing the tumbling of the seed after all of the chemical has been absorbed. These figures from a small scale laboratory test are, of course, useful as a guide later when seed corn is being treated in larger quantities on a commercial scale.

The shaft 8 has cylindrical end portions 14 mounted in bearings 15, and any suitable or preferred means may be employed for driving the shaft at a speed of from 60 to 70 r.p.m. Thus, a pulley 16 is shown fixed to one end portion of the shaft 8 having an endless belt 17 for transmitting drive thereto from a smaller pulley 18 provided on one end of a counter-shaft 19. A larger pulley 20 on the other end of the shaft 19 is driven by a smaller pulley 21 by means of another belt 22. An electric motor 23 transmits drive through suitable reduction gearing indicated at 24 to the shaft carrying the small pulley 21, and by this three stage reduction the slow speed drive for shaft 8 is obtained.

The operation is believed to be clear from the foregoing description. The operator can run twelve different experiments in seed treating at one time with twelve jars 6, placing different amounts of kernels in each jar and varying the amount of chemical, all with a view to determining not only what proportions of say dieldrin and aerosan give the best results, but also what amount per kernel, inasmuch as an accurate record is kept of the crop yield and it is possible therefore to determine with reasonable accuracy, what amount of chemical treatment insures the best germination and freedom from pests, assuming all other conditions are equal. The transparency of the jars enables the operator to check the progress of the treatment from time to time and to be sure when all of the chemical has been absorbed before the seeds are removed and put in the correspondingly numbered envelopes 13. On each envelope 13 will be placed a record for future reference concerning the amount of chemical absorbed, the time required for such absorption, the proportions of dieldrin and aerosan, or whatever other chemicals are employed, and so forth. Crop rows are all marked in the experimental farming to correspond with the records on envelopes 13 so that an opportunity is given for good comparison of the results obtained, to determine pretty accurately the efficiency, so that just enough treatment is given for best results and there is no wasting of chemicals.

It is believed the foregoing description conveys a good understanding of the objects and advantages of my invention. The appended claims have been drawn to cover all legitimate modifications and adaptations.

I claim:

1. Apparatus for agitating seed in contact with a seed treating material comprising, an elongated rotor, plural pairs of radially opposed screw caps fixed to said rotor at spaced intervals along the length thereof, each pair of screw caps longitudinally of the rotor being radially disposed at 90° variance from any screw cap pair next adjacent thereto on said rotor, a plurality of screw top jars detachably secured one to each screw cap on the rotor, and power means having operable drive connection with said rotor.

2. Apparatus for agitating seed in contact with a treating material comprising, an elongated rotor, plural pairs of radially opposed screw caps positioned adjacent the rotor at spaced intervals therealong, each pair of screw caps longitudinally of the rotor being secured to the rotor by parallel bolt means interconnecting the caps of each pair through the rotor, each pair of screw caps longitudinally of the rotor being radially disposed at 90° variance from any screw cap pair next adjacent thereto, a plurality of screw top receptacles detachably secured one to each screw cap on said rotor, and power means having operable drive connection with said rotor.

References Cited in the file of this patent

UNITED STATES PATENTS

| | | |
|---|---|---|
| 423,362 | Wells | Mar. 11, 1890 |
| 1,302,294 | Bogaerts | Apr. 29, 1919 |
| 2,436,289 | Carlson | Feb. 17, 1948 |
| 2,678,809 | Seilberger | May 18, 1954 |
| 2,901,227 | Russum | Aug. 25, 1959 |